United States Patent
Martin Pina et al.

(10) Patent No.: US 11,760,265 B2
(45) Date of Patent: Sep. 19, 2023

(54) ASSEMBLY FOR ATTACHING THE MOUNTING STRUCTURE OF AN EXTERIOR REARVIEW MIRROR FOR VEHICLES AND REARVIEW MIRROR INCLUDING IT

(71) Applicant: COMPAÑÍA LEVANTINA DE REDUCTORES, S.L., Ibi (ES)

(72) Inventors: Vicente Martin Pina, Ibi (ES); Arturo Picó Anotlí, Ibi (ES); Gonzalo Sobrino Málaga, Ibi (ES); Jorge Palacios Cortés, Ibi (ES); José Manuel Barroso Ossorio, Ibi (ES)

(73) Assignee: COMPAÑÍA LEVANTINA DE REDUCTORES, S.L., Ibi (ES)

( * ) Notice: Subject to any disclaimer, the term of this patent is extended or adjusted under 35 U.S.C. 154(b) by 24 days.

(21) Appl. No.: 17/433,382

(22) PCT Filed: Feb. 20, 2020

(86) PCT No.: PCT/ES2020/070125
§ 371 (c)(1),
(2) Date: Aug. 24, 2021

(87) PCT Pub. No.: WO2020/174107
PCT Pub. Date: Sep. 3, 2020

(65) Prior Publication Data
US 2022/0144171 A1    May 12, 2022

(30) Foreign Application Priority Data

Feb. 26, 2019  (ES) ................ ES201930175

(51) Int. Cl.
*B60R 1/076* (2006.01)
*B60R 1/074* (2006.01)

(52) U.S. Cl.
CPC .............. *B60R 1/076* (2013.01); *B60R 1/074* (2013.01)

(58) Field of Classification Search
CPC ................................ B60R 1/074; B60R 1/076
(Continued)

(56) References Cited

U.S. PATENT DOCUMENTS 5,636,071 A * 6/1997 Mochizuki ............. F16H 1/225
359/872
6,130,514 A * 10/2000 Oesterholt .............. B60R 1/074
359/872

(Continued)

FOREIGN PATENT DOCUMENTS

EP    0807551    * 11/1997

*Primary Examiner* — Ricky D Shafer
(74) *Attorney, Agent, or Firm* — BENESCH, FRIEDLANDER, COPLAN & ARONOFF LLP

(57) ABSTRACT

This invention refers to a fixation assembly corresponding to the mounting structure of an wing mirror, where such mounting is carried out in such a way that one part of the fixation assembly, the mirror actuator, is mounted on another part of the assembly, which is the bracket that forms part of the mounting base of the said assembly, which is attached to the door/body of the vehicle by inserting the rotation shaft into the bracket, being able to rotate the base of said rotation shaft inside the bracket and making its fixed positioning at one point in its rotation and blocking the further rotation to prevent its exit from said fixed position.

9 Claims, 4 Drawing Sheets

(58) Field of Classification Search
USPC .................................. 359/841, 877
See application file for complete search history.

(56) References Cited

U.S. PATENT DOCUMENTS

| | | | | |
|---|---|---|---|---|
| 6,979,091 | B2* | 12/2005 | Ichikawa | B60R 1/074 |
| | | | | 359/872 |
| 7,137,715 | B2* | 11/2006 | Schuurmans | B60R 1/074 |
| | | | | 248/479 |
| 7,546,997 | B2* | 6/2009 | Van Stiphout | B60R 1/076 |
| | | | | 359/872 |
| 7,815,324 | B2* | 10/2010 | Sakata | B60R 1/076 |
| | | | | 248/478 |
| 7,887,202 | B1* | 2/2011 | Peterson | B60R 1/074 |
| | | | | 359/877 |
| 8,123,369 | B2* | 2/2012 | Itoh | B60R 1/074 |
| | | | | 359/872 |
| 9,914,393 | B2* | 3/2018 | Di Giusto | B60R 1/076 |
| 10,766,419 | B2* | 9/2020 | Bouaziz | G02B 7/182 |
| 11,173,843 | B2* | 11/2021 | Peterson | B60R 1/074 |
| 2002/0075578 | A1* | 6/2002 | Assinder | B60R 1/07 |
| | | | | 359/877 |
| 2019/0061627 | A1* | 2/2019 | Lescroart | B60R 1/076 |

* cited by examiner

ASSEMBLY FOR ATTACHING THE MOUNTING STRUCTURE OF AN EXTERIOR REARVIEW MIRROR FOR VEHICLES AND REARVIEW MIRROR INCLUDING IT

The present invention refers to a fixation assembly for the mounting structure of an wing mirror, where said assembly is carried out in such a way that one part of the fixation assembly, the mirror actuator, is mounted on another part of the assembly, which is the bracket that forms part of the mounting base of said assembly, which is attached to the door/body of the vehicle.

BACKGROUND OF THE INVENTION

The wing mirrors of vehicles, as part of the set of parts corresponding to the assembly of a vehicle, are subject to the requirements of minimising production costs and assembly times/costs.

These needs shown by the automotive sector in all its products related to the parts that make up the vehicle, allow the knowledge of a multitude of sets of mirrors with designs that try to simplify both the parts and the number of them used, as well as the ease and speed of assembly, in order to reduce the final cost, maintaining a correct operation to reduce subsequent costs for breakdowns.

The known assembly sets, which are therefore considered to be part of the known state of the art, are based on a wing mirror, which has at least one part that is attached to the body/door of the vehicle, whose function is to be the basis of the mounting of the other part containing the mirror itself and its motorised or manual turning system.

As mentioned above, the ease of this assembly is essential to reduce assembly costs and operational reliability. The known fixation assemblies carry out the assembly on the rotation shaft, where this rotation shaft, in addition to exerting as the rotation shaft of the set, has the means to become the fixation element to the base and, together with the piece that is coupled to it, form the actuator sub-assembly. Between the rotation shaft and the coupled part there is relative movement to carry out the rest of the assembly, and this relative movement between both parts can even occur after it.

On the other hand, the fixation of this actuator sub-assembly in the mounting base, in the bracket, is also known in the state of the art, having an upper input and a fixation not permanently blocked in this fixing position, since it does not prevent the further rotation of the actuator sub-assembly in the bracket of the base, with the possible problem of unwanted further rotation of the actuator sub-assembly.

Other conventional systems require a rotation shaft and an external spring to carry out the fixation. They also need assembly tools and a series of sliding tracks to avoid friction.

These known embodiments include a greater complexity of assembly, a usually greater number of pieces and a final result that does not achieve an anchorage of the fixing position and an effective locking thereof with a simple configuration and reduced manufacturing and assembly costs.

DESCRIPTION OF THE INVENTION

The objective of the present invention is to provide a fixation assembly of the wing mirror mounting structure for vehicles, as well as to provide a wing mirror including said fixation assembly, which manages to solve the aforementioned inconveniences, presenting other advantages which will be described below.

According to this objective, according to a first aspect, the present invention provides a fixation assembly of the mounting structure for the wing mirror for vehicles, which has a bracket attached to the body/door of the vehicle and a rotation shaft to which the parts of the wing mirror destined to change position by its pivot in this shaft are coupled, where the rotation shaft is fixed to the bracket.

The fixation assembly is characterised in that it comprises, at least:

a rotation shaft, in the form of a shank, which has a coupling base, from which the shank forming the rotation shaft extends, where the coupling base has at least some means of fixation of the position of the shaft in the bracket and some means of locking the rotation with respect to the bracket;

a bracket fixed jointly to the base of the wing mirror, the base of the wing mirror being fixed jointly to the body/door of the vehicle, where this bracket has one side with an opening for the entry of the coupling base of the rotation shaft and an internal groove/space behind the entry opening which acts as a longitudinal entry stop and through which the coupling base of the rotation shaft can rotate without longitudinal displacement of the exit in the direction of the rotation shaft once this rotation of the base of the rotation shaft with respect to the bracket is made;

This configuration is also characterised in that the base of the rotation shaft has a geometry that is perceptibly equal, in at least one position, to the opening of the bracket, the bracket having in the inner groove of rotation and fixation of the base of the rotation shaft some means of anchorage of the means of fixation of the shaft and some elements of stopping or coupling to the means of locking of the rotation of the base of the rotation shaft.

In the same way, this invention is also characterised in that the means of fixation of the position of the rotation shaft are formed by a protuberance and/or recess/opening that is complementary to the means of anchorage the groove of the bracket and prevent, once the rotation to this position has been carried out, the rotation in the opposite direction.

Another feature of the invention is based on the fact that the means of locking the rotation of the rotation shaft are formed by a protuberance and/or stop that come into contact in its rotation with the elements of stopping or coupling of the bracket, which prevents further rotation in the intended direction of fixation.

This arrangement allows to have a fixation assembly, that achieves a fixation of the rotation shaft in the base in a safe manner, since it incorporates an insertion of the base in the interior of the bracket by the opening of geometry similar to the base of the rotation shaft, so that once inside the bracket, it has a stop to avoid the continuation of the longitudinal displacement of insertion in the bracket, and a groove to be able to turn in the interior of the bracket and to complete its fixation.

Once the rotation is made in the bracket, since the geometry of the opening of the bracket no longer coincides with that of the base, the rotation shaft is fixed longitudinally in the groove. In its rotation, the present configuration allows the double mounting position to be fixed, one by means of the shaft position fixation means on the bracket in the bracket anchorage means and a second by means of the rotation locking means so that it cannot be rotated further in the direction of the fixation, since in the reverse the position fixation means already do so.

With this configuration, the use of means of locking the rotation avoids a continuation in the direction of rotation of the rotation shaft fixation in the groove of the bracket, which could lead to repositioning the base in an angular position that would make its geometry coincide again with the geometry of the opening of the bracket, with which the undesired option of removing the base from the bracket could be had.

According to a possible embodiment of the invention, the means of fixation of the position of the rotation shaft are formed by a ramp-shaped protuberance which comes into contact in its rotation for fixing with another complementary ramp as means of anchorage of the bracket, so that once said ramp has been saved from the means of anchorage, the means of fixation of the position of the shaft, remain in a recess of the means of anchorage with a stop of the ramp of the means of anchorage the bracket, which prevents rotation in the direction opposite to the anchorage.

In order to carry out this execution of the fixation of the rotation position, optionally but preferably, when the ramp of the means of fixation of the rotation shaft position comes into contact with the complementary ramp of the means of anchorage of the bracket, to avoid this contact between ramps, there is a longitudinal displacement between the base of the rotation shaft and the bracket, which has an elastic resistance that exerts a force against this longitudinal displacement.

This arrangement of the means of fixation of the position of the rotation shaft on the bracket allows the insertion and positioning of the rotation shaft at the desired point, in a quick and efficient manner, preventing it from turning back and keeping the joint assembly in that position without relative movements, with elastic means of pressure acting to maintain the resistance of the change of relative position between the elements that make up the fixation assembly.

Preferably, the means of locking the rotation of the rotation shaft are formed by a protuberance that moves in its rotation through an opening or recess of the bracket and that comes into contact in its rotation with the end of this opening or recess, which prevents further rotation in the direction of fixing, corresponding to the area of the recess of the means of anchorage of the fixation of the position.

Optionally, both the means of fixation of the shaft position on the bracket and the means of locking the rotation with respect to the bracket are part of the same part of the rotation shaft. This allows an important reduction of parts and a simplicity in the assembly superior to the alternative solutions that could incorporate other auxiliary parts.

Also optionally, the rotation shaft has coupling housings for a fixed part, where this fixed part is inserted in the rotation shaft in a coaxial way by the pivot until reaching its base where it is coupled in the housings of the base of the rotation shaft where it joins in its radial movement, where this fixed part has in its non-fixed face the base of the rotation shaft.

In an alternative possible embodiment, and in reference to the coupling of the fixed part in the rotation shaft in a coaxial way to the shank, the coupling housings of the base of the rotation shaft and the perimeter form of the fixed part that is coupled in this rotation shaft, have complementary forms with a single angular position of coupling, the fixed part being joined in the radial movement with the rotation shaft.

This allows the piece to be assembled in a certain position so that the free face of the fixed piece, once the assembly is fixed to the bracket, has its ramps, protuberances and/or recesses arranged in a certain and known position for the operation of the rotation movements of the pieces that are placed on said fixed piece.

According to an embodiment of the invention, once the rotation shaft and the fixed piece are coupled and the rotation of them is carried out in the inner groove of the bracket, the fixed piece is also attached to the rotation shaft in its displacement in the longitudinal axis.

This is achieved by having the fixed part, of some part inside the groove of the bracket accompanying the base of the rotation shaft, avoiding having to have auxiliary means of fixation of the fixed part in the rotation shaft, thus minimising part costs by simplifying it.

According to a second aspect, the present invention proposes a wing mirror that is characterised in that it includes a fixation assembly of its mounting structure as indicated in the previous paragraphs.

This makes it possible to create a mirror that is simple and efficient to assemble, with a fixation on the base that ensures its positioning using the means seen above.

BRIEF DESCRIPTION OF THE DRAWINGS

In order to better understand the description made, a set of drawings has been provided which, schematically and solely by way of non-limiting example, represent a practical case of embodiment.

DESCRIPTION OF A PREFERRED EMBODIMENT

Below is a description of a number of embodiments of the fixation assembly of the wing mirror mounting structure for vehicles, as well as of the wing mirror including the fixation assembly of this invention, with reference to the figures indicated above.

Figure 1:
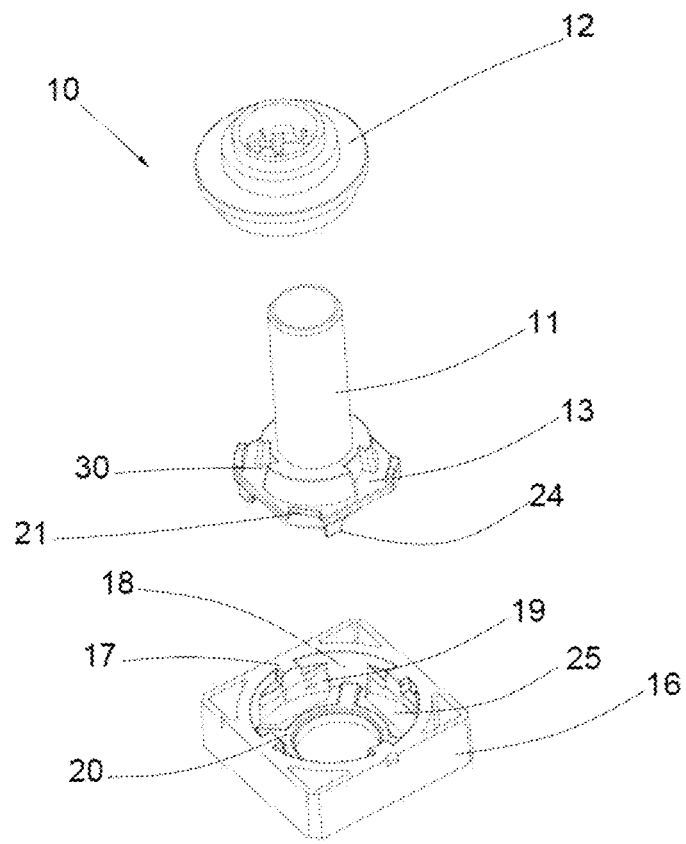
FIG. 1 is a exploded view of the elements of the fixation assembly.

According to a preferred embodiment, and as can be seen in FIG. 1, the fixation assembly (10) basically incorporates three main elements, a rotation shaft (11), or shank, which acts as the element on which the moving part of the wing mirror (100) will pivot.

On the other hand, a fixed part (12) is inserted in the rotation shaft (11) in a coaxial way, to be coupled jointly to the base (13) of this rotation shaft (11) and to create an actuator sub-assembly (11, 12).

Finally, as another basic element in the fixation assembly (10) there is a bracket (16) that is located next to the base of the wing mirror (100) that is fixed to the vehicle in its body and/or door.

Figure 2:
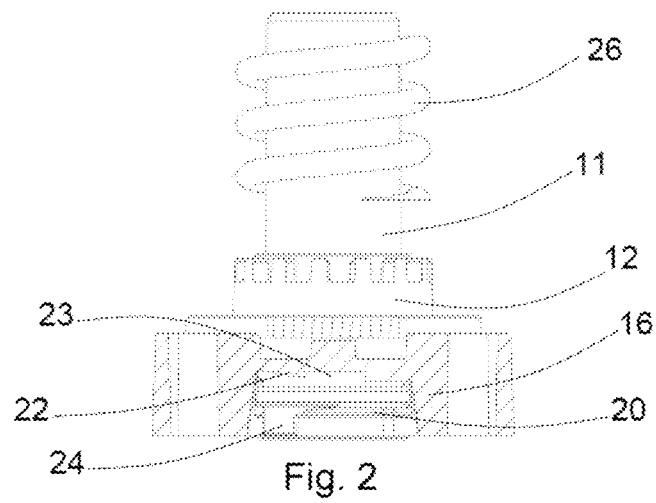
FIG. 2 is a longitudinal cross-sectional side view of the rotation shaft with a fixed part attached to its base and the actuating sub-assembly (rotation shaft and fixed part) inserted into the bracket in its initial insertion position.
Figure 3:
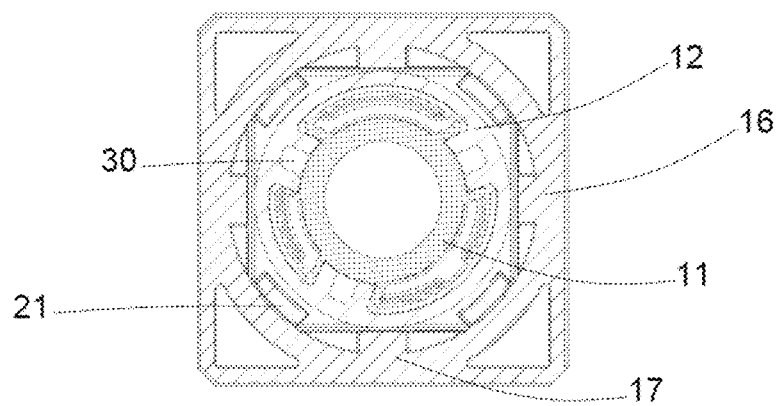
FIG. 3 is a lower cross-sectional view of the rotation shaft with the fixed part attached to its base and the actuating sub-assembly (rotation shaft and fixed part) inserted into the bracket in its initial insertion position.
Figure 4:
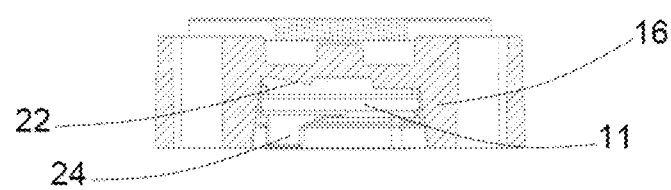
FIG. 4 is a side cross-sectional view of the rotation axis with the fixed part attached to its base and the actuating sub-assembly (rotation axis and fixed part) inserted into the bracket in its initial insertion position.

As can be seen in FIGS. 2 to 4, the bracket (16) has a receiving face (17) for the actuator sub-assembly (11, 12) with an opening (18) that has a geometry perceptibly identical to the base (13) for the introduction through said opening (18) and that once inside it, a rotation of said actuator sub-assembly (11, 12) can be made, by a space (19) in the form of a groove or similar, between the receiving face (17) as a retaining element for the output of the actuating sub-assembly (11, 12), and the seat (20) of the bracket (16) as a stop element for the insertion displacement of the actuating sub-assembly (11, 12) in said bracket (16).

The fixed part (12) is coupled to the base (13) of the rotation shaft (11), the perimeter shapes of the fixed part (12) fitting into the housings/protuberances (30) of the base (13). With this coupling, the actuating sub-assembly (11, 12) moves jointly in the radial movement. The fixation on the base (13) of the fixed part (12) also means that certain parts of the fixed part (12) are below the receiving face (17) of the bracket (16), which also makes a retention of the fixed part (12) together with the rotation axis (11) in its longitudinal movement with respect to the direction of insertion in the bracket (16) coaxial with the rotation shaft (11).

Figure 5:
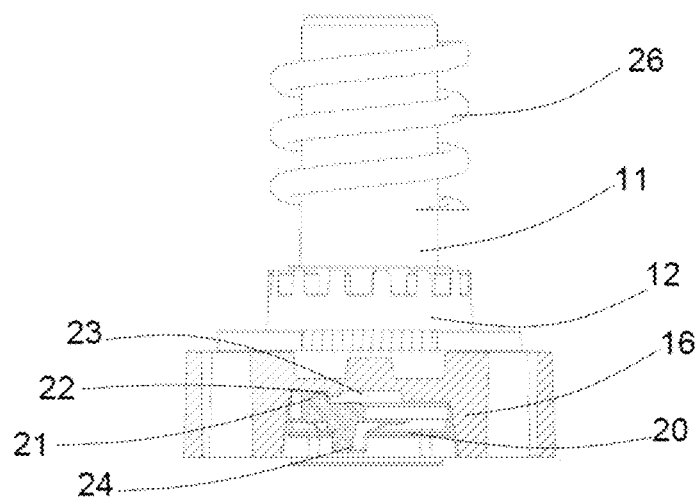
FIG. 5 is a longitudinal cross-sectional side view of the rotation shaft with the fixed part coupled to its base and the actuating sub-assembly (rotation shaft and fixed part) inserted into the bracket in its starting position of the rotation for fixing.
Figure 6:
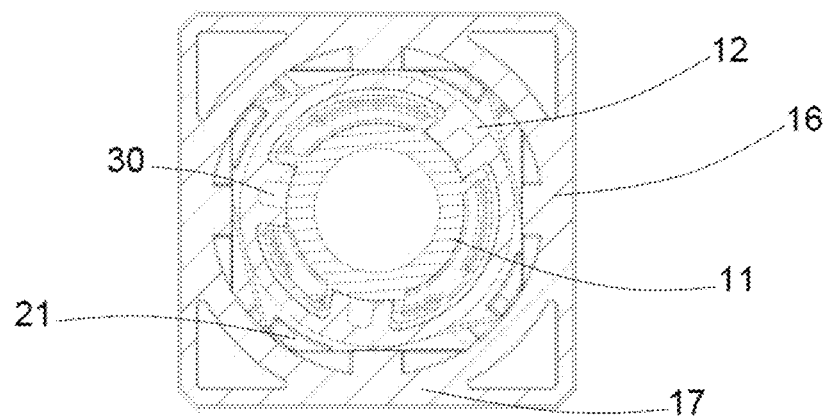
FIG. 6 is a lower cross-section view of the rotation shaft with the fixed part attached to its base and the actuating sub-assembly (rotation shaft and fixed part) inserted into the bracket in its starting position for fixing.
Figure 7:
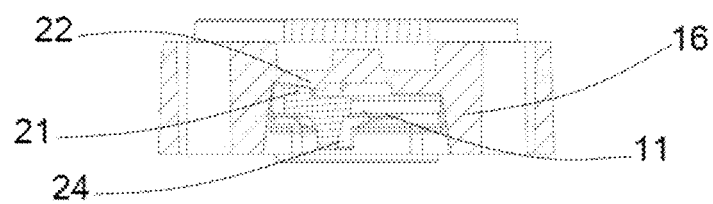
FIG. 7 is a side cross-sectional view of the rotation shaft with the fixed part coupled to its base and the actuating sub-assembly (rotation shaft and fixed part) inserted into the bracket in its starting position for fixing.
Figure 8:
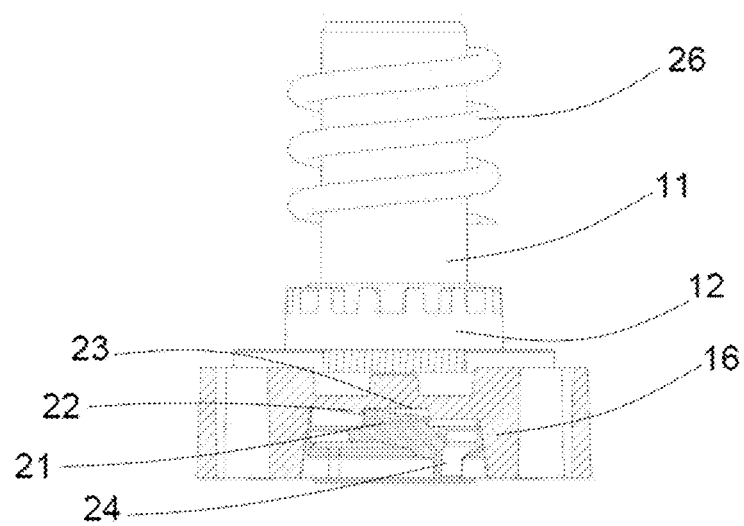
FIG. 8 is a longitudinal cross-sectional side view of the rotation shaft with the fixed part attached to its base and the actuating sub-assembly (rotation shaft and fixed part) inserted into the bracket in its position for fixing.
Figure 9:
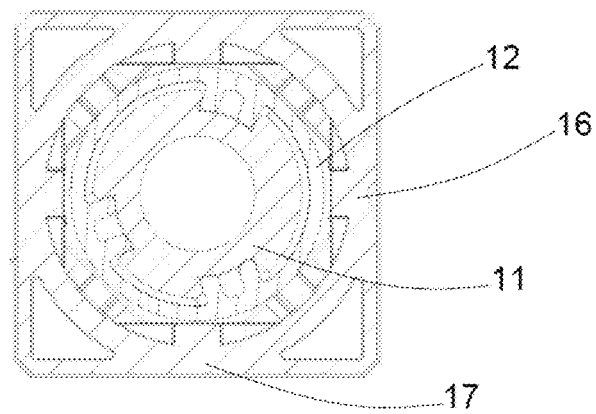
FIG. 9 is a lower cross-sectional view of the rotation shaft with the fixed part attached to its base and inserted the actuating sub-assembly (rotation shaft and fixed part) into the bracket in its starting position for fixing.
Figure 10:
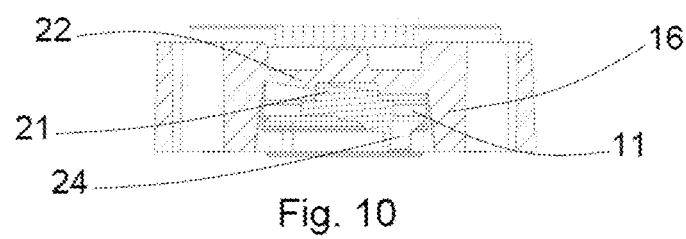
FIG. 10 is a side cross-sectional view of the rotation shaft with the fixed part coupled at its base and the actuating sub-assembly inserted (rotation shaft and fixed part) into the bracket at its starting position for fixing.

As part of the base (13) of the rotation shaft (11), there is a ramp-shaped protuberance (21), as a means of fixation of the position, which once in the space/groove (19) inside the bracket (16) when the actuating sub-assembly (11, 12) rotates, comes into contact with the means of anchorage of this bracket (16), formed by an additional ramp (22), as can be seen in FIGS. 5 to 7. In the step of saving this ramp (22) of the bracket (16) a slight longitudinal displacement of the base (13) of the rotation shaft (11) with respect to the bracket (13) is carried out to overcome this ramp (22), returning to its longitudinal position in a recess (23) of fixing the position perceptibly equal to the initial one, although slightly separated as this housing is not at the same level carrying out a certain compression, as can be seen in FIGS. 8 to 10.

Once the ramp (22) has been bridged, the bracket has the recess (23) with walls perpendicular to the spinning plane of the rotation shaft (11) for its retention. In order to prevent the ramp (21) of the rotation shaft (11) from overcoming the perpendicular wall that follows in the direction of rotation of the fixation, there is a protuberance (24) at the base (13) of the rotation shaft (11) as a locking element of the fixation to stop at the end of the section of the opening (25) of the seat (20), coinciding with the area of fixation of the position of the recess (23) in the bracket. In the present embodiment, this blocking protuberance (24) is part of the same part of the base (13)

The fixation assembly (10), in the assembly of the rotating mechanism (50) of the mirror to be installed in it, shall incorporate a spring (26) as an elastic element which exerts pressure against any movement of displacement of the rotation shaft (11) which is a longitudinal displacement of the insertion position in the fixing space/groove (19).

Figure 11:
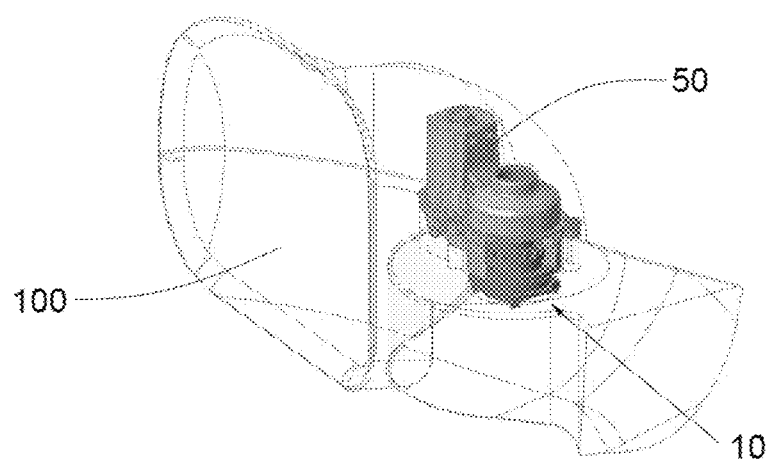
FIG. 11 is a perspective view of a wing mirror with a rotating mechanism which has the fixation assembly which is the subject of this invention.

As an alternative embodiment to the above, the protuberances and recesses can be exchanged in an equivalent manner between the interacting parts, so that the effect achieved is not altered. In the same way, and also in an alternative way, the ramps can be substituted by curved elements, as for example ratchets, that also obtain the same effect sought, without altering the essence of the characterising the invention The wing mirror (100), as can be seen in FIG. 11, which contains the previous fixation assembly (10), has the advantages provided by the previous embodiments, allowing the fixing structure to be assembled in the base of the wing mirror (100) which is attached to the body/door of the vehicle.

Despite the fact that reference has been made to a specific embodiment of the invention, it is clear to a person skilled in the art that the fixing assembly of the wing mirror mounting structure for vehicles, as well as the wing mirror including the described fixation assembly, is susceptible to numerous variations and modifications, and that all the details mentioned can be replaced by other technically equivalent ones, without departing from the scope of protection defined by the attached claims.

The invention claimed is:

1. Fixation assembly of a wing mirror mounting structure for vehicles, comprising a bracket configured to attach to a body/door of a vehicle, and a rotation shaft on which moving parts of the wing mirror comprising a mirror housing and a reflective element disposed therein are able to pivot, where the rotation shaft is attached to the bracket, characterised in that the fixation assembly (10) comprises at least:
   the rotation shaft (11), as a shank, comprising a coupling base (13), from which the shank forming the rotation shaft (11) extends, where the coupling base (13) comprises means of fixation (21) of a shaft position of the rotation shaft (11) in the bracket (16) and means of locking (24) a rotation with respect to the bracket (16);
   the bracket (16) fixed jointly to a base of the wing mirror (100), the base of the wing mirror (100) being attached jointly to the body/door of the vehicle, where the bracket (16) has one side (17) with an opening (18) for an inlet of the coupling base (13) of the rotation shaft (11) and an inner groove/space (19) behind the opening (18) which acts as a longitudinal inlet stop and through which the coupling base (13) of the rotation shaft (11) can rotate without longitudinal displacement of an output in the direction of the rotation shaft (11) once the coupling base (13) of the rotation shaft (11) is rotated with respect to the bracket (16);
   where, the coupling base (13) of the rotation shaft (11) has a geometry that is perceptibly equal, in at least one position, to the opening (18) of the bracket (16), the bracket (16) having in the inner groove/space (19) of rotation and fixation of the coupling base (13) of the rotation shaft (11), means of anchorage of the means of fixation (21) of the rotation shaft (11), and elements for stopping or coupling to the means of locking (24) of the rotation of the coupling base (13) of the rotation shaft (11);

where the means of fixation (21) of the shaft position of the rotation shaft (11) in the bracket (16) consists of a protuberance and/or recess/opening which is complementary to the means of anchorage of the groove (19) of the bracket (16) and prevents, once rotation to the shaft position where the rotation shaft (11) is fixed in the bracket (16) has been carried out, turning in an opposite direction;

where the means of locking (24) the rotation of the rotation shaft (11) consists of a protuberance and/or stop that comes into contact in its rotation with the elements for stopping or coupling, which prevents further rotation in an intended direction of fixation; and wherein both the means of fixation (21) of the shaft position on the bracket (16), and the means of locking (24) the rotation with respect to the bracket (16), are part of the same part of the rotation shaft (11).

2. Fixation assembly of the wing mirror mounting structure for vehicles, according to claim 1, wherein the means of fixation (21) of the shaft position of the rotation shaft (11) consists of a ramp-shaped protuberance which comes into contact in its rotation for attachment with a complementary ramp (22) as means of bracket anchorage, once the complementary ramp (22) has been saved from the means of anchorage, the means of fixation of the shaft position remain in a recess (23) of the means of anchorage with a stop in the complementary ramp of the means of anchorage of the bracket (16), which prevents it from rotating in the opposite direction to the fixation.

3. Fixation assembly of the wing mirror mounting structure for vehicles, according to claim 2, wherein upon the ramp-shaped protuberance (21) of the means of fixation (21) of the shaft position of the rotation shaft (11) is coming into contact with the complementary ramp (22) of the means of anchorage of the bracket (16), to avoid this contact between the ramp-shaped protuberance (21) and the complementary ramp (22), there is a longitudinal displacement between the coupling base (13) of the rotation shaft (11) and the bracket (16), which has an elastic resistance exerting a force against such longitudinal displacement.

4. Fixation assembly of the wing mirror mounting structure for vehicles, according to claim 1, wherein the means of locking (24) the rotation of the rotation shaft (11) are formed by a protuberance that moves in its rotation through an opening (25) or recess of the bracket (16) and that comes into contact in its rotation with the end of this opening (25) or recess, which prevents further rotation in the direction of fixing, corresponding to the area of the recess (23) of the means of anchorage the fixing position.

5. Fixation assembly of the wing mirror mounting structure for vehicles, according to claim 1, wherein the rotation shaft (11) has coupling housings (30) for a fixed part (12), where the fixed part (12) is inserted in the rotation shaft (11) in a coaxial way by the pivot until reaching the coupling base (13) where it is coupled in the housings (30) of the coupling base (13) of the rotation shaft (11) where it joins in its radial movement, where the fixed part (12) has in its non-fixed face the base of the rotation shaft (11).

6. Fixation assembly of the wing mirror mounting structure for vehicles, according to claim 5, wherein the housings (30) of the coupling base (13) of the rotation shaft (11) and the perimeter shape of the fixed part (12) which is coupled in the rotation shaft (11), have complementary forms with a single angular position of coupling, the fixed part (12) being joined in the radial movement with the rotation shaft (11).

7. Fixation assembly of the wing mirror mounting structure for vehicles, according to claim 6, wherein once the rotation shaft (11) and the fixed part (12) are coupled and rotated in the groove (19) inside the bracket (16), the fixed part (12) also moves jointly with the rotation shaft (11) in its displacement in the longitudinal axis.

8. A wing mirror, characterised in that it includes a fixation assembly (10) of the wing mirror mounting structure, as indicated in claim 1.

9. Fixation assembly of the wing mirror mounting structure for vehicles, according to claim 5, wherein once the rotation shaft (11) and the fixed part (12) are coupled and rotated in the groove (19) inside the bracket (16), the fixed part (12) also moves jointly with the rotation shaft (11) in its displacement in the longitudinal axis.

* * * * *